United States Patent [19]
Faerber

[11] Patent Number: 6,128,513
[45] Date of Patent: Oct. 3, 2000

[54] METHOD AND BASE STATION SYSTEM FOR VOICE TRANSMISSION VIA A RADIO INTERFACE IN A DIGITAL RADIO COMMUNICATION SYSTEM HAVING MOBILE STATIONS AND BASE STATIONS

[75] Inventor: Michael Faerber, Wolfratshausen, Germany

[73] Assignee: Siemens Aktiengesellschaft, Munich, Germany

[21] Appl. No.: 08/992,303

[22] Filed: Dec. 17, 1997

[30] Foreign Application Priority Data

Dec. 19, 1996 [DE] Germany .......................... 196 53 122

[51] Int. Cl.[7] ...................................................... H04B 1/38
[52] U.S. Cl. .............................................................. 455/561
[58] Field of Search ...................... 455/561, 560, 455/67.3, 557

[56] References Cited

U.S. PATENT DOCUMENTS

| | | | |
|---|---|---|---|
| 5,490,183 | 2/1996 | Nishimura et al. ...................... | 455/561 |
| 5,742,640 | 4/1998 | Haoui et al. ............................. | 455/561 |
| 5,898,931 | 4/1999 | I'Anson et al. .......................... | 455/561 |

FOREIGN PATENT DOCUMENTS 0 472 511  2/1992  European Pat. Off. .

OTHER PUBLICATIONS

"Mobilfunk und Intelligenete Netze," J. Biala (1995), pp. 57–92.

Siemens AG Publication "System Netzübersicht" GSM (TED–NET), A30808–X3232–Y104–1–18 (1995), pp. 65–67.

*Primary Examiner*—Nguyen Vo
*Assistant Examiner*—Greta Fuller
*Attorney, Agent, or Firm*—Hill & Simpson

[57] ABSTRACT

In a method for voice transmission via radio interface in a digital radio communication system, at least one signal is transmitted between a mobile station and a base station. At least one characteristic value with respect to the transmission conditions of the radio interface is identified from the signal. The characteristic value or values are compared to a threshold and a voice encoder is selected according to the comparison result, with a voice encoder having a higher data rate being employed given good transmission conditions and a voice encoder having a lower data rate given poor transmission conditions. A base station system operating according to the method is also disclosed.

8 Claims, 6 Drawing Sheets

METHOD AND BASE STATION SYSTEM FOR VOICE TRANSMISSION VIA A RADIO INTERFACE IN A DIGITAL RADIO COMMUNICATION SYSTEM HAVING MOBILE STATIONS AND BASE STATIONS

BACKGROUND OF THE INVENTION

1. Field of the Invention

The present invention is directed to a method and to a base station system for voice transmission via a radio interface in a digital radio communication system having mobile stations and base stations.

2. Description of the Prior Art

A base station system is part of a digital radio communication system, for example a GSM mobile radio telephone network (Global System for Mobile Communications, as known from J. Biala, "Mobilfunk und intelligenete Netze", VIEWEG Verlag, Braunschweig/Wiesbaden, 1995, particularly pages 57–92).

Mobile communication systems enable the setup of a communication connection to a subscriber among a number of mobile subscribers so that information, particularly voice information, can be transmitted via a radio interface. A number of subscribers on the same carrier frequency of this radio interface can be separated by different time slots in a type of system known as , a time-division multiplex communication system. The time-division multiplex method is also referred to as TDMA (Time Division Multiple Access) method. Further methods for separating the subscribers can be employed at the radio interface in addition to or alternatively to time-division multiplex. A frequency-division multiplex is offered in addition to the time-division multiplex in the GSM mobile radio telephone system.

A mobile communication system has at least one base station system that, for example, contains a base station controller that is connected to a number of base stations. The base stations respectively cover radio "broadcast" areas and each base station makes radio-based resources available for mobile stations in the radio area of that base station. The radio areas of neighboring base stations thereby overlap, so that a handover procedure is possible for a communication connection for a mobile station between two base stations. Each base station thus can manage only a limited supply of radio-based resources. In, for example, the GSM mobile radio telephone system, such radio-based resources are formed by channels that are characterized by their frequency and the time slots.

In a GSM mobile radio telephone system, for example, the base station controller assumes the function of a radio channel switching stage within the base station system, and controls the base stations. In particular, the base station controller realizes the functions of management of radio channels of the base stations and administration and execution of handover procedures.

Voice encoders that generate a data rate that is lower than the 64 kbit/s data rate of PCM30 channels are usually utilized in digital mobile radio telephone systems. This is necessary since the radio-based resources available are tight. For further-development of voice encoders, half-rate encoders that employ half the data rate of the voice transmission have been planned in the GSM and in the D-AMPS mobile radio telephone system. Full-rate and half-rate voice encoders are thus available.

European Application 0 472 511 discloses a digital mobile radio telephone system that employs two different voice encoders. The bit error rate of the transmission between mobile station and base station is thereby regularly measured. The half-rate encoder is employed given a low bit error rate and a full-rate encoder is employed given a high bit error rate.

SUMMARY OF THE INVENTION

It is an object of the present invention to provide a method for voice transmission via a radio interface in a digital radio communication system having mobile stations and base stations wherein the voice transmission is improved. It is a further object to provide a base station operating in accordance with the method for improving voice transmission in such a communication system.

In the inventive method and base station system for voice transmission via a radio interface, at least one signal is transmitted between a mobile station and the base station. At least one characteristic value with respect to the transmission conditions of the radio interface is determined from the signal. The characteristic value or values are compared to respective thresholds which are indicative of the current transmission conditions. A voice encoder from among at least two voice encoders is selected in conformity with the comparison result, with a voice encoder with a higher data rate being employed given good transmission conditions and a voice encoder with a lower data rate is employed given poor transmission conditions.

This selection of a voice encoder makes use of the fact that the subjective speech reproduction quality of both voice encoders differs dependent on the transmission conditions. The voice encoders behave differently given changing influences due to noise or common-channel interference.

If the voice encoders are a full-rate encoder and a half-rate encoder of a GSM mobile radio telephone system, then a subscriber prefers the full-rate encoder under good channel conditions, whereas the half-rate encoder is preferred given poor channel conditions. Inventively, the voice quality for a subscriber of the radio communication system is improved by continuously monitoring the quality of the transmission conditions.

A reception level, a bit error rate and/or a value proportional to the signal transit time between the mobile station and the base station can be employed as the characteristic value according in an embodiment of the invention. Given a high reception field strength, a low bit error rate and short signal transit times, one can assume good transmission conditions. The full-rate encoder is then selected.

By contrast to the solution disclosed in European Application 0 472 511, the inventive method and base station aim to select the voice encoder with the low data rate given poor quality—i.e., high bit error rate—, where fewer useful data bits are thus available for the voice information. The ratio of protection bits to useful data bits for the voice encoder having the higher data rate is preferably lower than given the voice encoder having the low data rate. The higher proportion of protective bits leads to a higher immunity to interference and leads to a higher reproduction quality of the voice information given poor channel conditions. A different source code method is utilized in half-rate encoders, this reducing the required source code by more than half compared to full-rate encoders, so that additional protection bits can be appended for enhancing the transmission dependability.

Measurements relating to the transmission conditions can be implemented both in the base station as well as in the mobile station and can be subsequently signaled to the base station. The decision about the voice encoder to be selected is advantageously undertaken in the base station system, for example in the base station or the base station controller.

According to another embodiment of the invention, at least two thresholds are employed, and a switching from a higher to a lower data rate occurs at one threshold, which is representative of a poorer transmission quality and a switching from a low to a higher data rate occurs at the other threshold, which is representative to a better transmission quality. A hysteresis is thus built in that prevents a constant switching (cycling) between the voice encoders given fluctuating transmission conditions in the boundary area. The constant switching can also be prevented by a timer switch that is reset after a switching, and prevents a renewed switching for an adjustable time.

The decision about the voice encoder to be selected is preferably made at the call beginning as well as during a connection. Moreover, this decision is additionally connected with a selection of a transmission channel of the radio interface and/or of a handover procedure. The inventive method can thus be easily implemented in existing mobile radio telephone networks. Characteristic values that can be taken especially easily from existing mobile radio telephone systems are the reception level and the bit error rate (that are recited as scaled values RXLEV, RXQAL) which are usually already present and can be involved in the comparison.

The thresholds are preferably predetermined by an operations and maintenance center and can be adapted from base station to base station, or in conformity with the momentary capacity factor of the mobile radio telephone system. Given a high work load of individual radio cells, it can be necessary to generally prefer the half-rate encoder.

DESCRIPTION OF THE PREFERRED EMBODIMENTS

Figure 1:
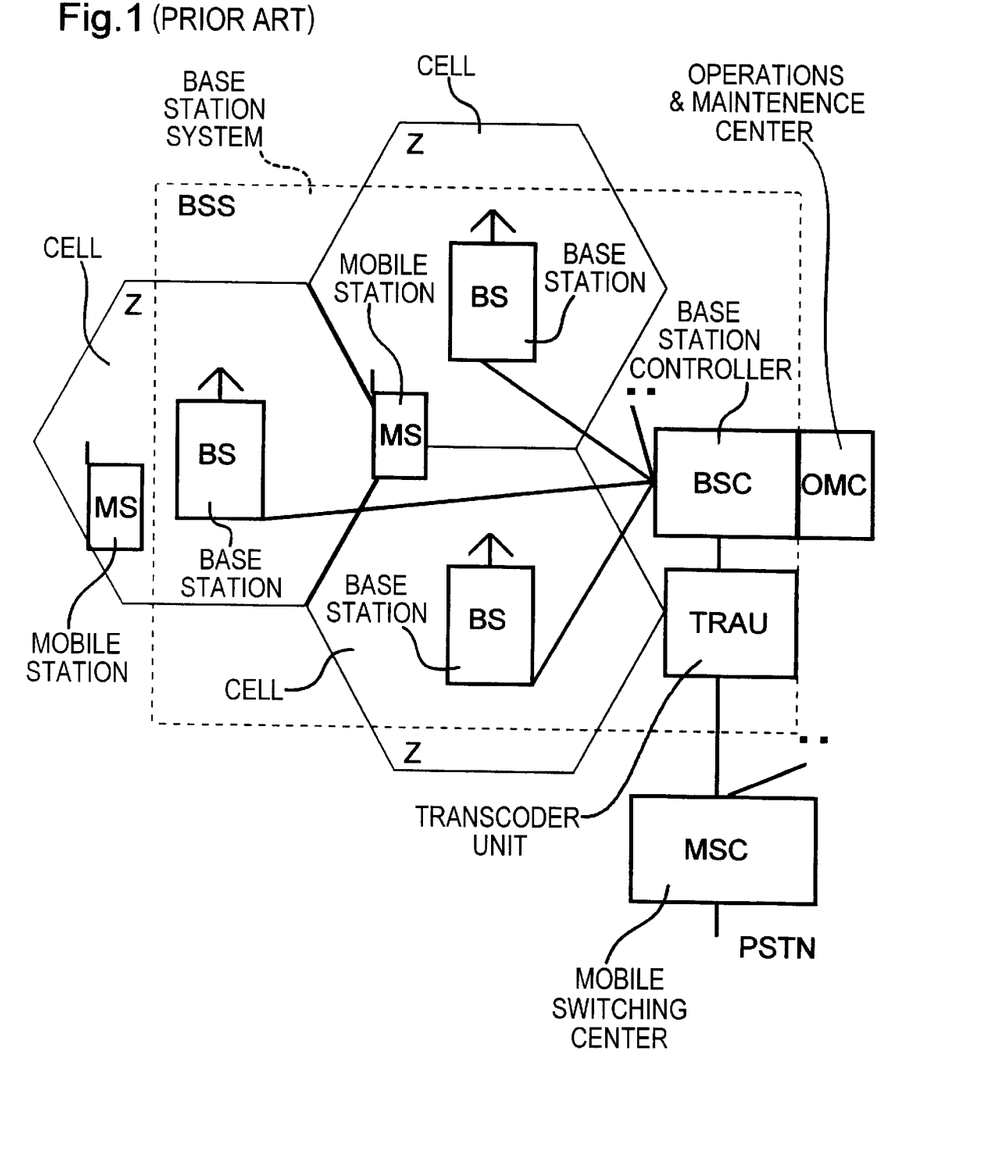
FIG. 1 is a block diagram of a known mobile communications system in which the inventive method and the inventive base station can be used.

The mobile communication system shown as an example in FIG. 1 is a known GSM mobile radio telephone system that is composed of one or more mobile switching centers MSC (one switching center MSC being shown) that are networked with one another or which provide access to a fixed network PSTN. Each mobile switching center MSC is connected via a transcoder unit TRAU to at least one base station controller BSC. Each base station controller BSC in turn enables a connection to at least one base station BS. Such a base station BS is a radio station that can set up a message connection to mobile stations MS via a radio interface.

Each base station BS covers a radio area. According to FIG. 1, the base stations BS cover, for example, respective radio areas (i.e., cells Z) shown simplified as hexagons. These radio areas form all cells Z of the totality of the radio network. Overlaps are provided between the cells Z, so that a mobile station MS in the overlap area can set up a connection to at least two base stations BS. A base station controller BSC, a transcoder unit TRAU and a number of base stations BS form a base station system BSS for which—according to FIG. 1—an operations and maintenance center OMC assumes the functions of error monitoring, network management and configuring of the individual radio areas.

Details regarding the fashioning of a base station system BSS are described in the Siemens AG publication, "System Netzubersicht" GSM (TED-NET), A30808X3232-Y104-1–18, 1995, particularly pages 65 through 67.

Figure 2:
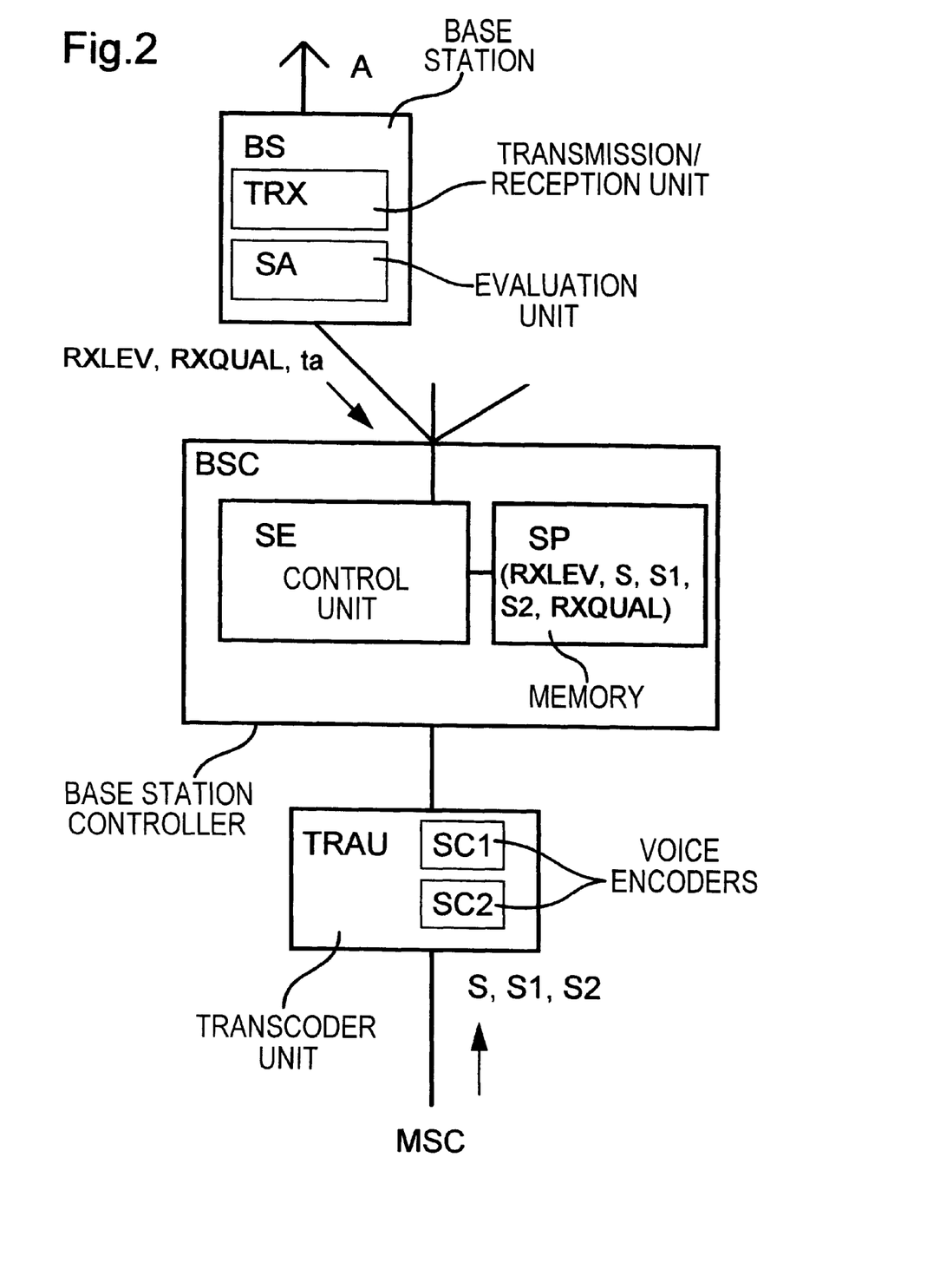
FIG. 2 is a block circuit diagram of components of a base station system.

Components of the base station system BSS form the base station BS, the base station controller BSC and the transcoder unit TRAU that are outlined as an example in FIG. 2. A base station controller BSC can be separate (stand-alone) unit or can be combined with a base station BS or other components of the communication network.

The base station controller BSC has connections to a number of base stations BS from which measured values about the transmission conditions from or to mobile stations MS arrive. Such measured quantities can be employed directly or derived values can be obtained therefrom after internal conversions are, for example, the reception level RXLEV, a scaled quantity relating to the bit error rate RXQUAL, a lead time ta (associated with the transit time) or a signal-to-noise ratio C/I. These values can also be determined by a mobile station MS.

A further input quantity of the base station controller BSC is the threshold S that is communicated as an individual value or in the form of sub-quantities S1, S2 from an operations and maintenance center OMC for each base station BS.

The base station controller BSC contains a memory SP in which the characteristic values RXLEV, RXQAL and, if used, ta and C/I, as well as the thresholds S, S1 and S2 are stored. In addition to further components that are of no significance for the invention, the base station controller BSC contains a control unit SE for comparing the characteristic value RXLEV, RXQUAL, ta, C/I to the thresholds S, S1, S2. A hysteresis is provided in these comparisons by means of positively and negatively offset threshold values for the decisions shown in FIGS. 3–7.

An exemplary base station BS connected to the base station controller BSC contains a transmission/reception unit TRX and a signal evaluation unit SA. Via an antenna, the base station BS receives traffic information and signaling information from mobile stations MS. The characteristic values RXLEV and RXQUAL are signaled from the mobile station MS, whereas the particulars relating to the signal transit time in the form of the lead time ta and particulars with respect to the signal-to-noise ratio C/I are acquired in the base station BS itself from the reception signals. It is likewise possible to employ values determined only in the mobile station MS or only in the base station BS or alternative combinations for the decision process.

The characteristic values RXLEV, RXQUAL, ta and C/I are signaled to the base station controller BSC from the base station BS.

A transcoder unit TRAU located between base station controller BSC and the mobile switching center MSC contains two voice encoders SC1 and SC2 with respectively differing data rates. The voice information of a communication connection arriving at the network side from the mobile switching center MSC, for example at 64 kbit/s via a PCM connection, are voice-encoded by one of the two voice encoders SC1 and SC2 and the encoded signals are forwarded to the base station controller BSC at 11.4 kbits (SC1) or 22.8 kbit/s (SC2). The data rates arise by a convolution encoding of the source code with appendment of protective bits. Given a full-rate encoder, one time slot is utilized for the voice transmission for the voice information per frame of the TDMA system. Given the half-rate encoder, only one time slot in every other frame is utilized. As a result, twice the nominal capacity can be obtained without modification of the radio interface in the channel structure. The selection of one of the voice encoders SC1 and SC2 ensues in response to instructions of the control unit SE of the base station controller BSC. Decoders and voice encoders at the mobile station MS that are not shown are correspondingly provided.

The control unit SE, the memory SP, the voice encoders SC1 and SC2, and the evaluation unit SA that are configured for the implementation of the inventive method alternatively can be arranged in other components of the base station system BSS in further versions of the invention. In particular, the trans-encoder unit TRAU can be integrated in the mobile switching center MSC as well as in the base station controller BSC.

The inventive method and the functioning of the evaluation unit SA, and the control unit SE are explained below with reference to FIGS. 3–7.

Figure 3:
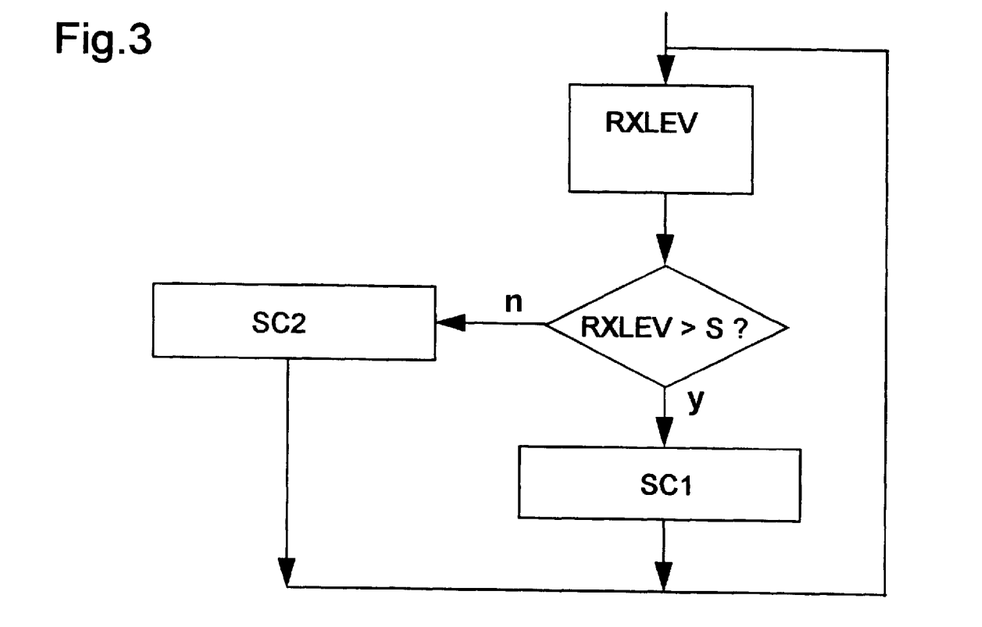
FIG. 3 is a flow chart of the inventive method with t he reception level as characteristic value.

As shown in FIG. 3, the reception level RXLEV is determined by the signal evaluation unit SA as a characteristic value for the transmission conditions to a mobile station MS. The determination of the reception level RXLEV ensues repeatedly, for example in cyclical intervals.

The reception level RXLEV is compared to the threshold S in the control unit SE. If the reception level RXLEV is higher than the threshold S, then the full-rate encoder SC1 is selected for the voice transmission. If the specific reception level RXLEV is lower than the threshold S, then the half-rate encoder SC2 is selected. A timer switch is provided for repetition of this decision procedure, so that the comparison is repeated with new measured values after a specific waiting time.

Figure 4:
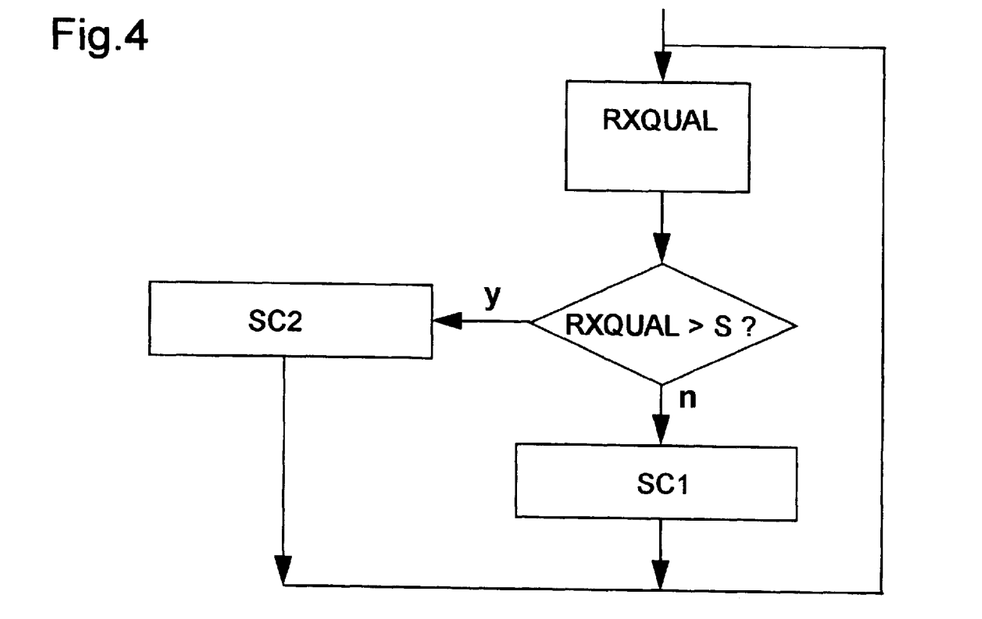
FIG. 4 is a flow chart of the inventive method with a quantity relating to the bit error rate as characteristic value.

As shown in FIG. 4, a quality parameter—the bit error rate (BER), expressed by the scaled value RXQUAL—is used for the comparison to the threshold S alternatively to the reception level RXLEV. Given a high bit error rate (high RXQUAL, poor transmission conditions) above the threshold S, the half-rate encoder SC2 is selected; the full-rate encoder SC1 is selected when the bit error rate is lower.

Figure 5:
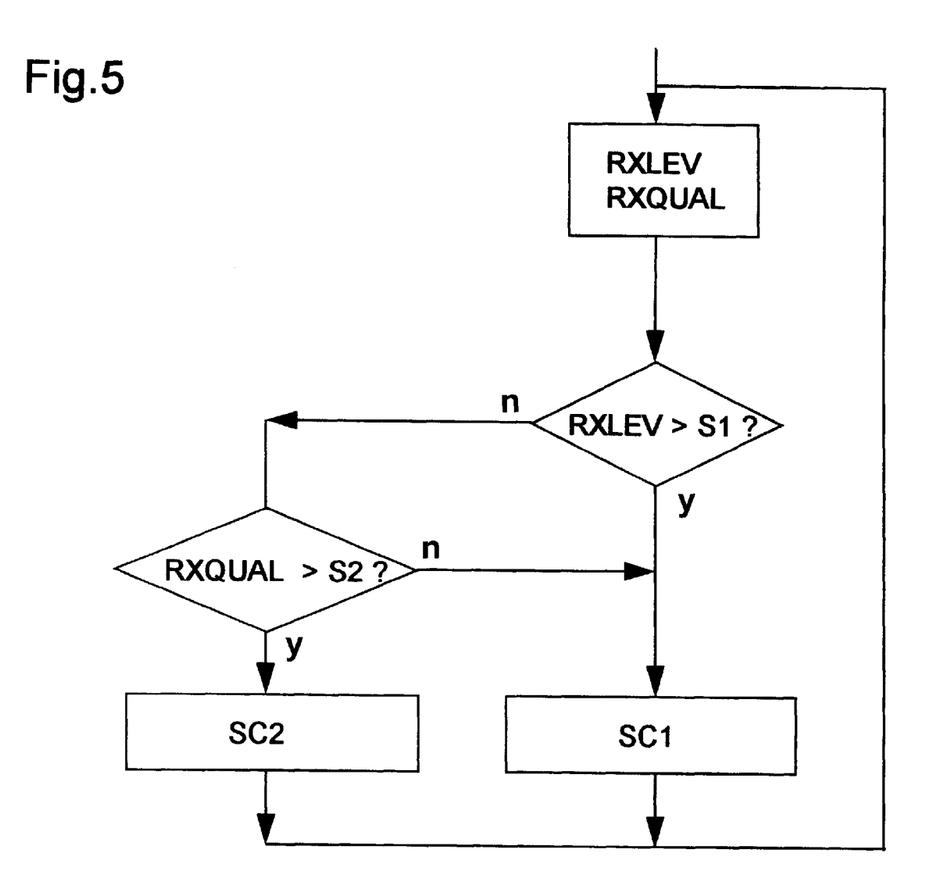
FIG. 5 is a flow chart of the inventive method with the reception level and a quantity relating to the bit error rate as characteristic values.

According to a third exemplary embodiment of FIG. 5, the reception level RXLEV and the bit error rate expressed as RXQAUAL are used to make two comparisons to respective thresholds S1 and S2. The half-rate encoder SC2 is selected when the reception level RXLEV is lower than the first threshold S1 and RXQUAL is higher than the second threshold S2 (the bit error rate is high).

Figure 6:
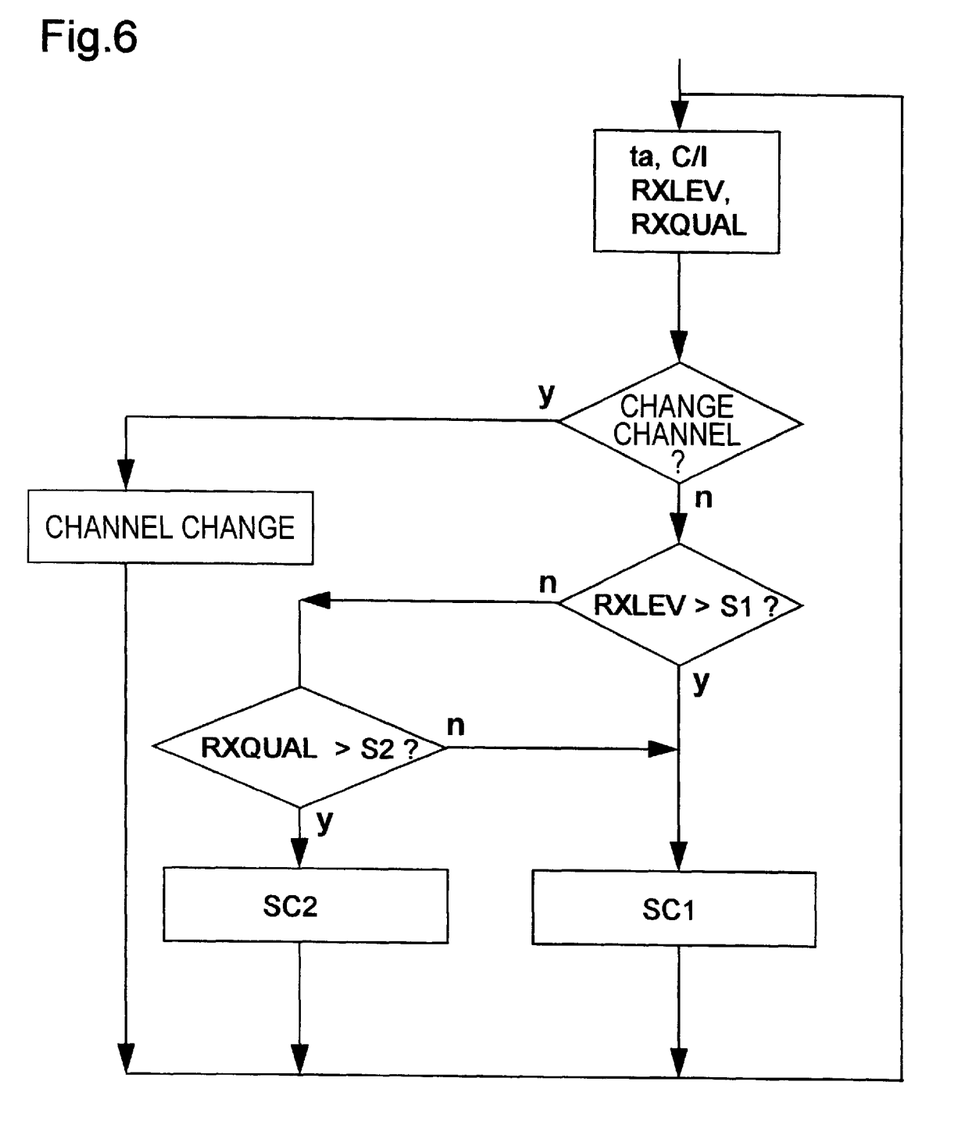
FIG. 6 is a flow chart of the inventive method in combination with a change of channels.
Figure 7:
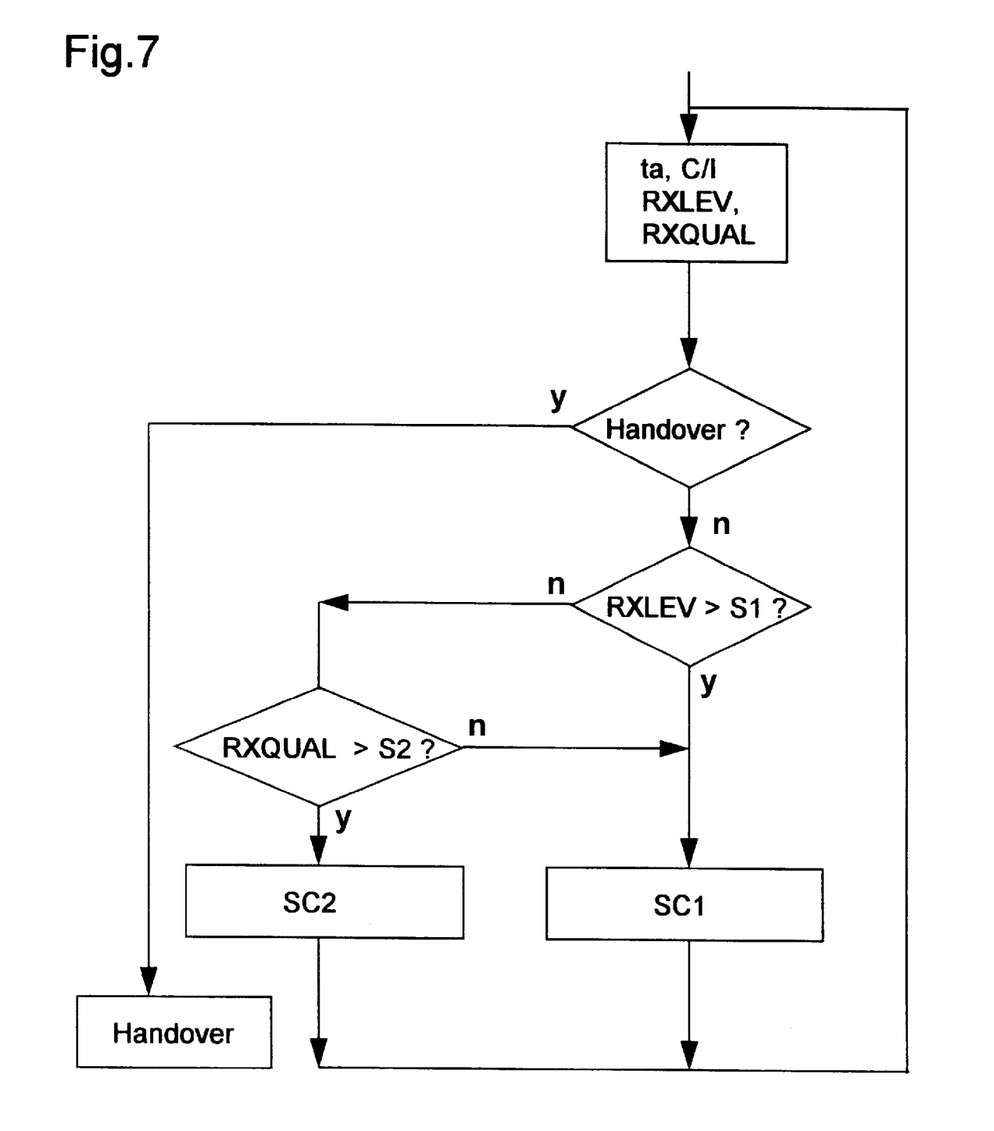
FIG. 7 is a flow chart of the inventive method in combination with a handover procedure.

According to further exemplary embodiments, FIGS. 6 and 7, the selection of a voice encoder SC1 and SC2 ensues in combination with decisions about a channel change or a handover procedure, respectively.

In the method of FIG. 6, a decision about a channel change ensues after the evaluation of the characteristics values RXLEV, RXQUAL, ta and/or C/I. If a channel change is not possible or when no channels having better transmission conditions are available, then the comparisons of FIG. 5 are implemented and a voice encoder SC1 or SC2 is selected. In the method of FIG. 7, a decision about a handover is made first and a new definition (selection) of the voice encoder SC1 or SC2 first ensues when no suitable, neighboring cell for the handover of the connection can be identified.

The execution of the change of voice encoder, channel change or change of the handover procedure should sequence as quickly and unnoticed as possible. This is assured primarily by procedures of the radio interface management in the base station controller BSC.

Network-side measurements of the neighboring base stations BS (measurement reporting/radio link control) and the lead times ta for the respective base stations BS can be employed as selection criteria for a channel or a neighboring radio area. A list of preferred channels or base stations BS that indicates respectively available radio-based resources and specific neighbor relationships between the channels and the radio areas can be taken into consideration.

A particular advantage of the inventive method is that an improvement of the voice quality can be achieved even given limited radio-based resources, for example, when only one transmission/reception unit TRX is present in the base station (thus, few alternatives for a qualitatively poor radio channel) or when no suitable handover candidates are present among the neighboring cells. A simple implementation can likewise be undertaken in existing mobile communication networks, for example in the GSM mobile radio telephone network, without extensive, circuit-based modifications having to be undertaken.

Although modifications and changes may be suggested by those skilled in the art, it is the intention of the inventor to embody within the patent warranted hereon all changes and modifications as reasonably and properly come within the scope of his contribution to the art.

I claim as my invention:

1. A method for voice transmission via a radio interface in a digital radio communication system having at least one mobile station and at least one base station, said method comprising the steps of:

transmitting at least one signal between a mobile station and a base station via a radio interface;

identifying at least one characteristic value of said signal indicative of a quality of transmission conditions of the radio interface;

comparing said characteristic value to a threshold and thereby obtaining a comparison result identifying current transmission conditions of said radio interface as being good or poor;

providing a plurality of voice encoders including at least a first voice encoder having a first data rate and a second voice encoder having a second data rate, said first data rate being higher than said second data rate;

employing a first ratio of protective bits to useful bits in said first voice encoder and employing a second ratio of protective bits to useful bits in said second voice encoder, said first ratio being lower than said second ratio; and     selecting said first voice encoder for encoding said signal if said comparison results indicates good transmission conditions and selecting said second voice encoder for encoding said signal if said comparison result indicates poor transmission conditions.

2. A method as claimed in claim 1 comprising the additional step of selecting said at least one characteristic value from the group of characteristic values consisting of a reception level at said base station, a bit error rate, and a value proportional to a signal transit time between said mobile station and said base station.

3. A method as claimed in claim 1 wherein the step of comparing said characteristic value to a threshold comprises comparing said characteristic value to at least two thresholds including a high threshold and a low threshold to obtain said comparison result, and switching from said first voice encoder to said second voice encoder for encoding said signal if said comparison result indicates poor transmission conditions and switching from said second voice encoder to said first voice encoder if said comparison result indicates good transmission conditions.

4. A method as claimed in claim 1 wherein said radio interface comprises a plurality of transmission channels, and said method comprising the additional step of selecting one of said transmission channels of said radio interface dependent on said comparison result.

5. A base station system for use in a digital radio communication system having at least one mobile station and at least one base station, said base station system comprising:

transmission/reception means for communicating at least one voice signal between a mobile station and a base station via a radio interface;

means for identifying at least one characteristic value of said signal indicative of a quality of transmission conditions of the radio interface;

comparator means for comparing said characteristic value to a threshold and thereby obtaining a comparison result identify current transmission conditions of said radio interface as being good or poor;

a plurality of voice encoders including at least a first voice encoder having a first data rate and a second voice encoder having a second data rate, said first data rate being higher than said second data rate;

said first voice encoder comprising an encoder employing a first ratio of protective bits to useful bits and wherein said second voice encoder comprising an encoder employing a second ratio of protective bits to useful bits, said first ratio being lower than said second ratio; and switching means for selecting said first voice encoder for encoding said signal if said comparison results indicates good transmission conditions and selecting said second voice encoder for encoding said signal if said comparison result indicates poor transmission conditions.

6. A base station system as claimed in claim 5 further comprising means for selecting said at least one characteristic value from the group of characteristic values consisting of a reception level at said base station, a bit error rate, and a value proportional to a signal transit time between said mobile station and said base station.

7. A base station system as claimed in claim 5 wherein comparator means comprises means for comparing said characteristic value to at least two thresholds including a high threshold and a low threshold to obtain said comparison result, and wherein said switching means comprises means for switching from said first voice encoder to said second voice encoder for encoding said signal if said comparison result indicates poor transmission conditions and switching from said second voice encoder to said first voice encoder if said comparison result indicates good transmission conditions.

8. A base station system as claimed in claim 5 wherein said radio interface comprises a plurality of transmission channels, and said base station system further comprising mens for selecting one of said transmission channels of said radio interface dependent on said comparison result.

* * * * *